Figure 1:
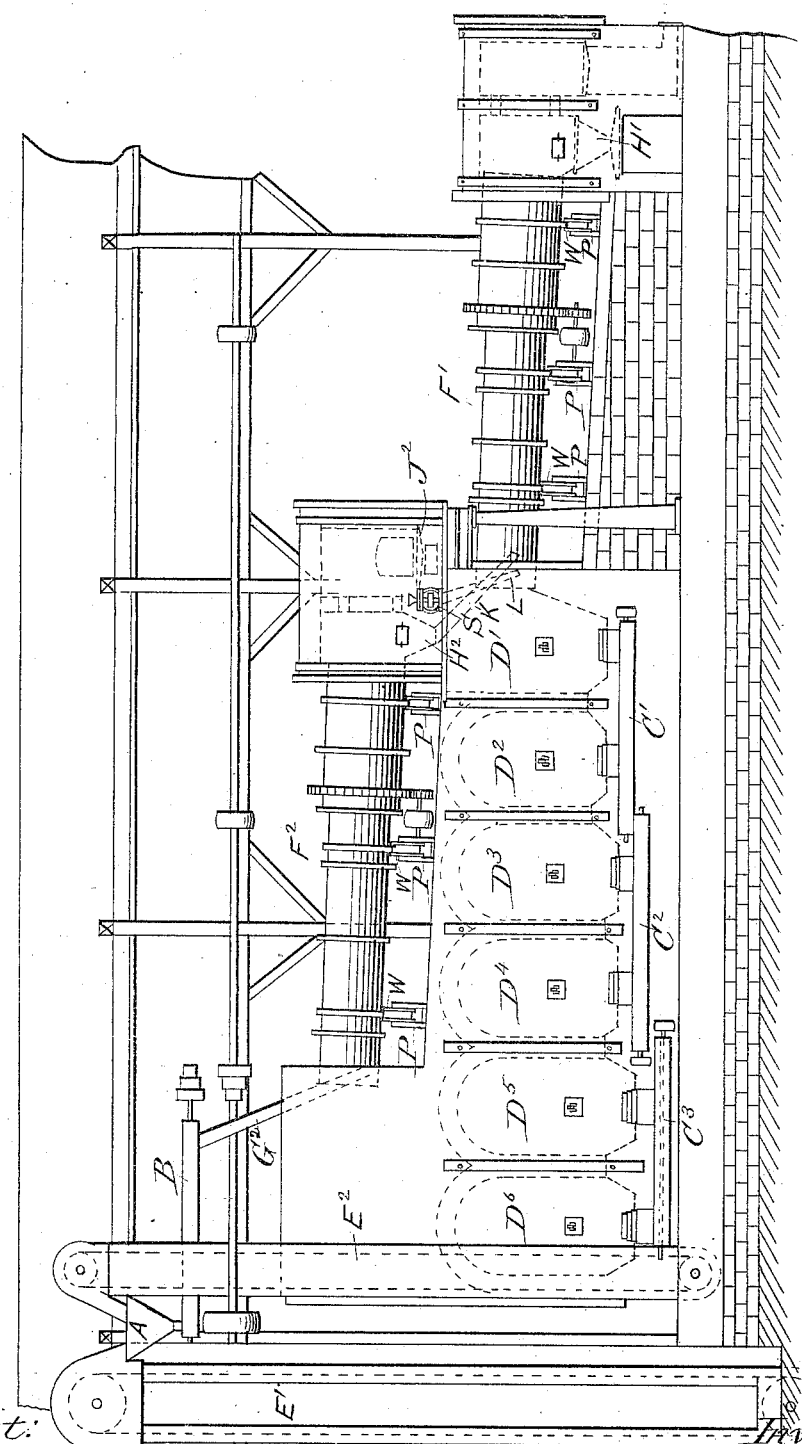

(No Model.) 4 Sheets—Sheet 1.

W. H. H. BOWERS.
CALCINING AND CHLORIDIZING FURNACE.

No. 311,804. Patented Feb. 3, 1885.

Attest:
F. H. Schott
A. R. Brown.

Inventor:
William H. H. Bowers
fr C. H. Watson & Co
atty

N. PETERS, Photo-Lithographer, Washington, D. C.

(No Model.) 4 Sheets—Sheet 3.
W. H. H. BOWERS.
CALCINING AND CHLORIDIZING FURNACE.
No. 311,804. Patented Feb. 3, 1885.

Attest.
F. H. Schott
A. R. Brown.

Inventor:
William H. H. Bowers

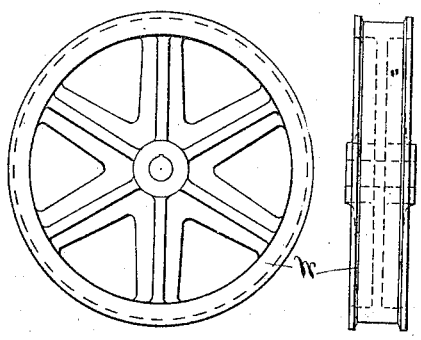
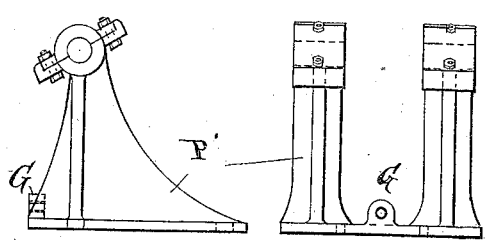
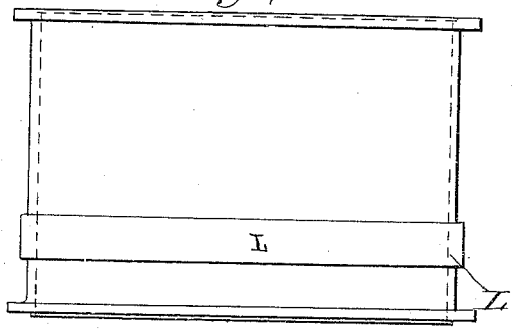
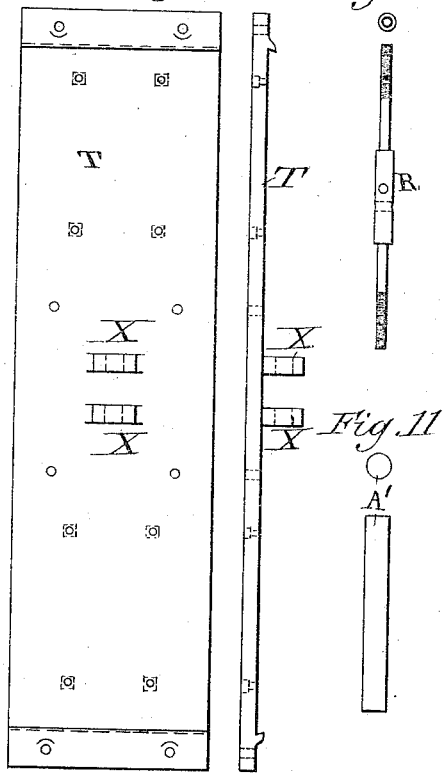
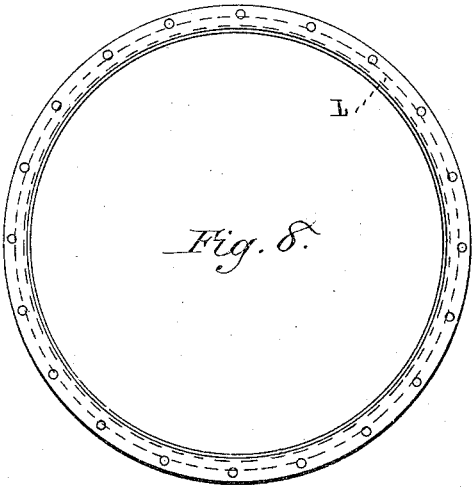

UNITED STATES PATENT OFFICE.

WILLIAM H. H. BOWERS, OF SALT LAKE CITY, UTAH TERRITORY.

CALCINING AND CHLORIDIZING FURNACE.

SPECIFICATION forming part of Letters Patent No. 311,804, dated February 3, 1885.

Application filed February 6, 1883. Renewed December 29, 1884. (No model.)

*To all whom it may concern:*

Be it known that I, WILLIAM H. H. BOWERS, a citizen of the United States of America, residing at Salt Lake City, in the county of Salt Lake and Territory of Utah, have invented certain new and useful Improvements in Calcining and Chloridizing Furnaces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved mode of chloridizing argentiferous ores and metallurgical products and the apparatus whereby the same is effected. It has long been known that when a silver ore had to be chlorinated prior to the extraction or amalgamation of the silver, the most judicious mode of proceeding was to roast the ore until all the sulphurets present were decomposed and reduced to the form of oxides and sulphates, then add salt and subject to the chlorinating roasting. It is possible to chlorinate silver ores by mixing them with salt in a raw (*i. e.*, unroasted) state, and then roasting them; but in such case a larger proportion of salt must be used and a much greater quantity of the base metals are converted into chlorides. This arises from the fact that when sulphurets of iron, copper, lead, zinc, and the like are exposed to the action of chlorine gas or volatile chlorides at a moderately-high temperature they are decomposed with the formation of chloride of sulphur and chloride of the base wherewith the sulphur was combined. This reaction takes place at a lower temperature than that required to oxidize the sulphurets; hence it is apparent that if cold raw ore be introduced into a furnace more or less filled with chlorine a large proportion of the sulphurets present will be converted into chlorides. When, on the other hand, oxides of iron, copper, lead, zinc, and the like are exposed to the action of chlorine gas at high temperatures, the only effect produced is to convert the lower oxides into such higher ones as can subsist at the temperature to which they are exposed. Thus, for example, protoxide of iron would be converted to sesquioxide; suboxide of copper would be converted into oxide. Oxide of lead would probably be unaltered. The same would be true of zinc, and so on. It is therefore evident that if a roasted ore be mixed with salt and again roasted, a much smaller quantity of the base metals will be converted into chlorides than if the raw ore had been mixed with salt and roasted. When a roasted ore containing base chlorides, and notably chlorides of lead or copper, is amalgamated, these chlorides are reduced by the iron of the amalgamating-pans and the metallic copper and lead thus formed amalgamated; hence the presence of base chlorides in a pulp which is to be amalgamated is disadvantageous, because they produce a greater corrosion of the pans and an impure and dirty amalgam, which when retorted yields an impure and base bullion.

The mode in which I arrange and work my furnaces will be described first and the special details of construction pointed out afterward.

Figure 2:
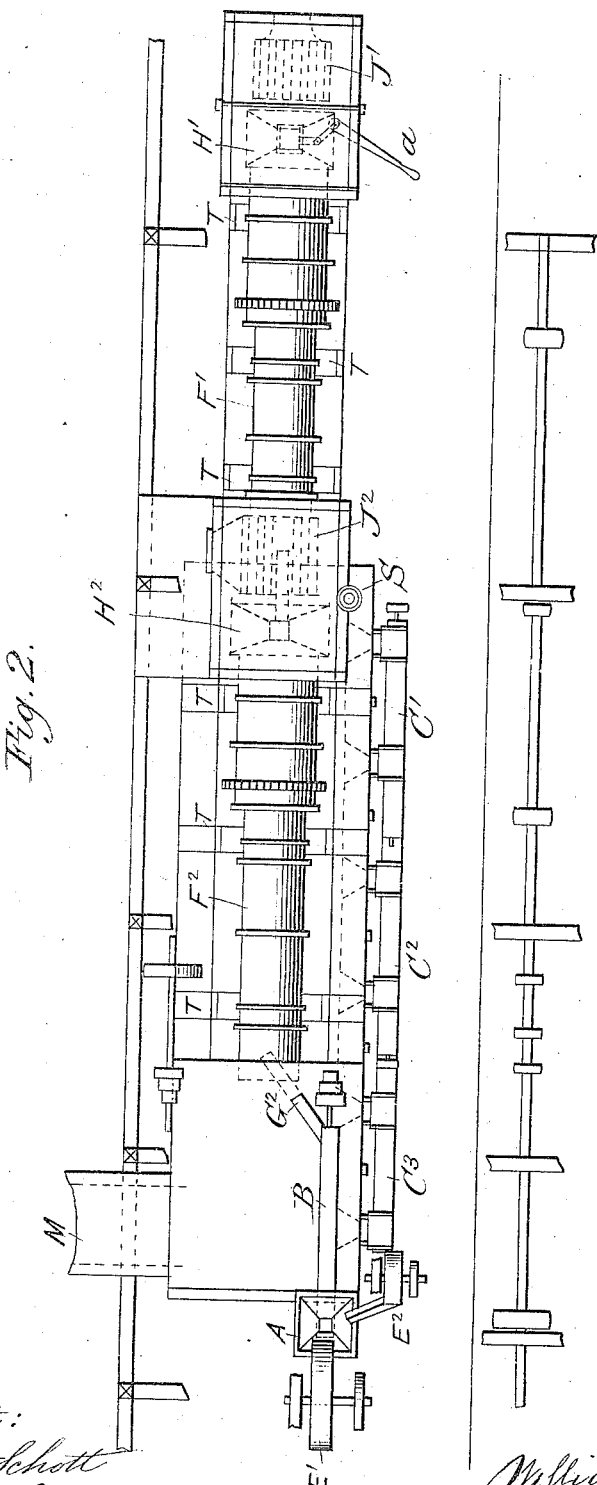
Figure 3:
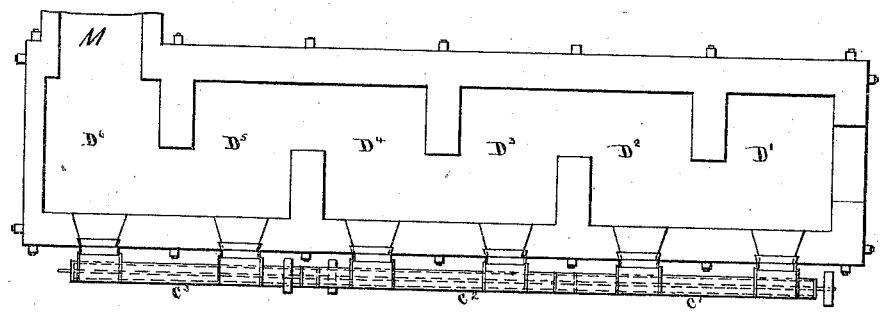
Figure 4:
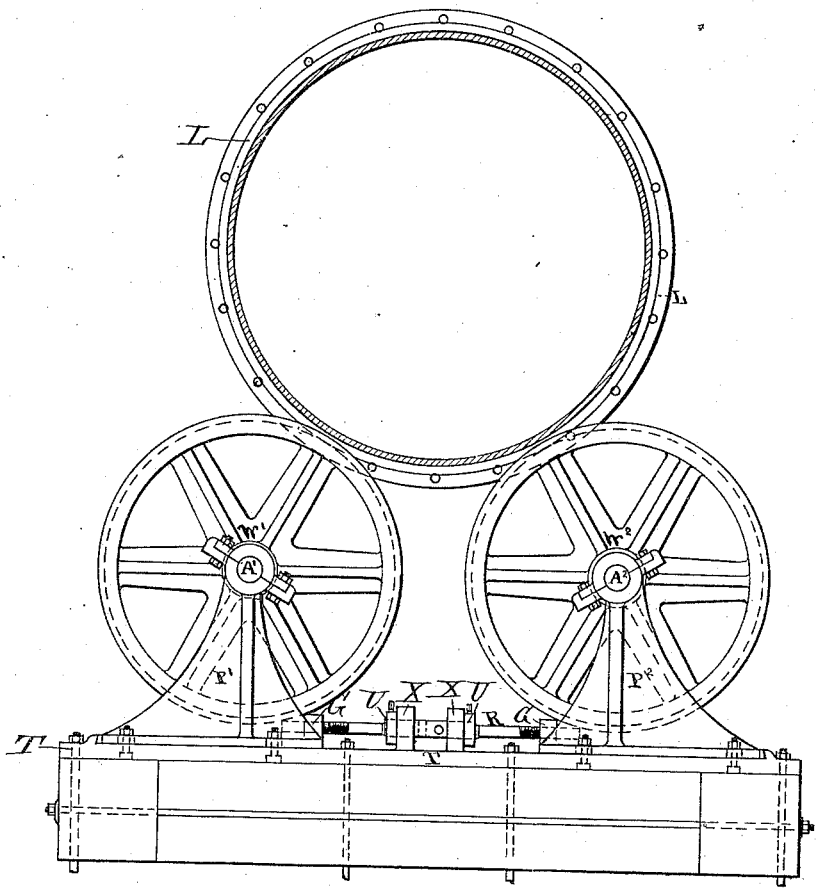

Figure 1 is an elevation, and Fig. 2, Sheet 1, a plan, of the plant which I employ. Fig. 3 is a plan of the dust-chambers. Fig. 4 is a transverse sectional elevation illustrating the manner of supporting the furnaces and adjusting their alignment. Fig. 5 represents a side view and an edge view of one of the driving-wheels. Fig. 6 shows a side view and an end view of one of the adjustable supporting-standards. Fig. 7 represents one of the rings of which the furnace is composed. Fig. 8 is an end view of the same. Fig. 9 represents a plan and an edge view of the bed-plate. Figs. 10 and 11 are details.

The pulp or crushed ore to be roasted is introduced, by means of the elevators E' E², hopper A, conveyer B, and spout G², in a continuous stream, into the back of the calcining-furnace F². This calcining-furnace consists of a cylindrical or tubular barrel, terminating and emptying into the hopper H², and is furnished with a suitable grate and fire-box, J². The cylindrical portion is slightly inclined, as shown in the drawings, and is kept continuously rotating about its axis. The ore, which is introduced by the spout $G^2$, is thus conveyed from the back of the furnace slowly to the front and emptied into the hopper $H^2$, and during its passage is heated by the fire on the grate $J^2$, and thus roasted or calcined. The fire on the grate $J^2$, the speed of rotation, and inclination of the tubular part of the furnace, together with the influx of air through suitable doors or openings above the fire, are so regulated that by the time the ore has arrived at and dropped into the hopper $H^2$ it has been roasted until all the sulphurets are decomposed and converted into sulphates and oxides, and has generally been brought into the state best adapted to secure a good chlorination.

Those skilled in the art of metallurgical roasting will understand that it is impossible to describe *a priori* and in general terms the exact composition which it would be most desirable to give by an oxidizing roasting or calcination to any special ore prior to adding salt and subjecting to a chloridizing roasting. Some ores would require the furnace to be sharply inclined and rotated quickly, so that the ore should run through fast. Others, again, would require a longer roasting, and would need a flatter inclination and slower speed of rotation. Some ores would need a brisk and others a slow fire. In some ores it would be most desirable to oxidize as large a proportion as possible of the sulphurets into sulphates, while with others it might be most advisable to push the roasting so far that a portion of the sulphates formed should be decomposed. The roasted oxidized or calcined ore passes from the hopper $H^2$ of the calcining-furnace $F^2$ through the spout K into the back of the chlorinating-furnace $F'$ in a continuous stream, while at the same time there is also introduced into the back of this furnace, by means of the spout L and any suitable feeding apparatus, S, a continuous stream of salt, the amount of salt fed being that which is proper for the chlorination of the particular ore which is being roasted.

The construction of the chlorinating-furnace $F'$ is in all respects similar to that of the calcining-furnace $F^2$, and the parts are similarly lettered. The fire on the grate $J'$, the inclination and speed of the tubular part of the furnace $F'$, and the influx of air are all so regulated that by the time the ore arrives at and falls into the hopper $H'$ it has been fully and properly chlorinated—that is to say, all, or as much as practicable, of the silver has, together with the smallest possible quantity of the base metals, been converted into chloride. It will at once be seen that there will be cases in which one chlorinating-furnace could chlorinate more ore than could be oxidized by one calcining-furnace. In such case I would either suitably adjust the dimensions of the furnaces, or, if this were for any reason impracticable or undesirable, I would arrange two or more calcining-furnaces side by side, so that they should deliver their product by separate or common spouts into the chlorinating-furnace. As the gases from the chlorinating-furnace $F'$ will be more or less charged with dust and volatile chlorides, which it would be desirable to save, I prefer to pass them through the dust-chambers $D'$ $D^2$ $D^3$ $D^4$ $D^5$ $D^6$, and thence into the flue M, leading to the chimney, and, for convenience of construction, I also prefer to place the calcining-furnace $F^2$ on the top of these dust-chambers and lead the dust products of combustion, &c., which it produces into the same flue, and thence into a common chimney, as is shown in the drawings; but it is of the essence of my invention that the calcining furnace or furnaces shall have separate openings, passages, or flues from the chlorinating-furnace, which shall be so arranged that the fumes, vapors, dust, smoke, &c., formed in the chlorinating-furnace do not pass through the calcining furnace or furnaces in their passage to the chimney.

As respects the details of the furnaces which I employ, these are shown in Sheets 2 and 3. They consist, generally, of the dust-chambers or smoke-box, barrel, or rotating part and hopper and fire-box. In constructing the hopper $H'$, I generally fit it with a door or slide to regulate the discharge of the roasted ore, (see Fig. 2,) in which $a$ is a handle or lever to move the slide in the bottom of the hopper. The barrel or rotating part I form by bolting together a number of cast-iron rings, B, furnished with suitable flanges, and lined wholly or in part with fire-brick. This barrel I rotate by means of spur-gearing.

The mode of supporting the furnace presents some novelties which will be more particularly described.

Some of the rings which compose the furnace-barrels have cast on them the projecting tracks L, Figs. 4, 7, and 8. These tracks run in two bearing-wheels, $W'$ $W^2$, Figs. 4 and 5, that are carried by shafts $A'$ $A^2$, journaled in the standards $P'$ $P^2$. These standards rest on the ribbed or grooved bed-plate T, and are united by a capstan-screw, R, that is cut with a right-hand screw at one end and a left-hand screw at the other. This capstan-screw passes through lugs X X on the bed-plate T, and is secured in place by set-collars U U, as shown in Fig. 4. The threaded portions of the screw R take into the tapped lugs G on the standards $P'$ and $P^2$, and it is evident that by turning the screw R the bearing-wheels $W'$ and $W^2$ can be moved nearer together or farther apart, and thus the alignment of the furnaces altered.

Having thus described my invention, what I claim as new, and desire to secure by Letters Patent, is—

1. The combination, with a rotary furnace, of the grooved or ribbed bed-plate T, having lugs X X, the adjustable standards $P'$ $P^2$, supported thereon, and having lugs G G, the capstan-screw R, secured by collars U U, and the wheels W' W², journaled in the adjustable standards, substantially as described.

2. The combination of the rotary furnaces F' F², adjustable standards P' P², bearing-wheels W' W², hoppers A H' H², dust-chambers D' D² D³ D⁴ D⁵ D⁶, chimney M, elevator E' E², and conveyer B, substantially as shown and described.

In testimony whereof I affix my signature in presence of two witnesses.

WILLIAM H. H. BOWERS.

Witnesses:
J. A. CUNNINGHAM,
GEORGE E. WALLACE.